United States Patent
Pivetti et al.

(10) Patent No.: US 11,286,829 B2
(45) Date of Patent: Mar. 29, 2022

(54) SYSTEM AND METHOD FOR CONTROLLING THE EMISSIONS OF A SPARK-IGNITION INTERNAL COMBUSTION ENGINE OF A MOTOR-VEHICLE

(71) Applicant: FCA Italy S.p.A., Turin (IT)

(72) Inventors: Gianluca Pivetti, Castelnuovo Rangone (IT); Fabio Bedogni, Casumaro-Cento (IT); Ettore Musu, Montale-Castelnuovo Rangone (IT)

(73) Assignee: FCA Italy S.p.A., Turin (IT)

( * ) Notice: Subject to any disclaimer, the term of this patent is extended or adjusted under 35 U.S.C. 154(b) by 39 days.

(21) Appl. No.: 16/788,344

(22) Filed: Feb. 12, 2020

(65) Prior Publication Data

US 2020/0256233 A1 Aug. 13, 2020

(30) Foreign Application Priority Data

Feb. 13, 2019 (EP) ..................................... 19156850

(51) Int. Cl.
*F01N 3/10* (2006.01)
*F01N 3/20* (2006.01)
(Continued)

(52) U.S. Cl.
CPC ............... *F01N 3/22* (2013.01); *F01N 3/101* (2013.01); *F01N 3/32* (2013.01); *F01N 9/00* (2013.01);
(Continued)

(58) Field of Classification Search
CPC ... F01N 3/101; F01N 3/22; F01N 3/32; F01N 3/30; F01N 9/00; F01N 2430/06;
(Continued)

(56) References Cited

U.S. PATENT DOCUMENTS

| | | |
|---|---|---|
| 3,943,709 A | 3/1976 | Holt |
| 5,388,402 A | 2/1995 | Aoki et al. |

(Continued)

FOREIGN PATENT DOCUMENTS

DE 102016111086 A1 5/2017

OTHER PUBLICATIONS

European Search Report dated Aug. 29, 2019. 3 pages.

*Primary Examiner* — Audrey B. Walter
*Assistant Examiner* — Dapinder Singh
(74) *Attorney, Agent, or Firm* — RMCK Law Group PLC (57) ABSTRACT

A system for controlling emissions of a motor-vehicle spark-ignition internal combustion engine includes first and second exhaust gas treatment devices and a secondary air feeding system for feeding secondary air into an exhaust gas conduit, between the first and second exhaust gas treatment devices. The secondary air feeding system is activated only when engine load is greater than a predetermined load value and/or when engine rotational speed is greater than a predetermined speed value. In this condition, an air/fuel ratio of the engine is kept at a value lower than the stoichiometric value, so as to feed the engine with a rich mixture. In one example, an electronic controller is configured for controlling activation of the secondary air feeding system on the basis of a map, as a function of values of the engine load and rotational speed. The map is predetermined depending upon specific characteristics of the engine.

16 Claims, 4 Drawing Sheets

(51) Int. Cl.
*F01N 9/00* (2006.01)
*F01N 3/22* (2006.01)
*F01N 3/32* (2006.01)
*F02B 75/12* (2006.01)

(52) U.S. Cl.
CPC ...... *F01N 2430/06* (2013.01); *F01N 2550/14* (2013.01); *F01N 2560/025* (2013.01); *F02B 2075/125* (2013.01); *F02D 2200/0802* (2013.01)

(58) Field of Classification Search
CPC ........... F01N 2550/14; F01N 2560/025; F01N 2900/0412; F01N 2900/1602; F02B 2075/125; F02D 41/0235; F02D 41/1444; F02D 41/027; F02D 41/1454; F02D 2200/0802; F02D 2250/036; F02D 2041/0265; Y02T 10/12; Y02A 50/20
USPC .................................................. 60/287, 288
See application file for complete search history.

(56) References Cited

U.S. PATENT DOCUMENTS

| | | |
|---|---|---|
| 5,410,872 A | 5/1995 | Adamczyk, Jr. et al. |
| 5,412,943 A | 5/1995 | Hosoya |
| 5,456,063 A | 10/1995 | Yoshizaki et al. |
| 5,519,992 A | 5/1996 | Hosoya et al. |
| 5,666,804 A | 9/1997 | Sekiya et al. |
| 6,978,600 B2 | 12/2005 | Hirooka |
| 8,783,020 B2 | 7/2014 | Springer et al. |
| 9,163,543 B2 | 10/2015 | Cavataio et al. |
| 9,517,434 B2* | 12/2016 | Nobukawa ......... B01D 53/9418 |
| 2004/0060282 A1 | 4/2004 | Hirooka |
| 2004/0172934 A1* | 9/2004 | Kita ........................ F01N 3/32 60/289 |
| 2005/0066650 A1* | 3/2005 | Demura ............. F02D 41/2438 60/276 |
| 2005/0109029 A1* | 5/2005 | Busch .................... F02B 37/00 60/605.1 |
| 2011/0072788 A1 | 3/2011 | Ruona et al. |
| 2013/0312391 A1* | 11/2013 | Cavataio ................. F01N 3/225 60/274 |

\* cited by examiner

SYSTEM AND METHOD FOR CONTROLLING THE EMISSIONS OF A SPARK-IGNITION INTERNAL COMBUSTION ENGINE OF A MOTOR-VEHICLE

CROSS-REFERENCE TO RELATED APPLICATION

This application claims priority to European Patent Application No. 19156850.0 filed Feb. 13, 2019. The disclosure of the above application is incorporated herein by reference in its entirety.

FIELD OF THE INVENTION

The present invention relates to systems for controlling the emissions of a spark-ignition internal combustion engine, of the type comprising:
- a conduit for the exhaust gases of the internal combustion engine,
- a first exhaust gas treatment device, interposed in the exhaust gas conduit and a second exhaust gas treatment device, interposed in the exhaust gas conduit, downstream of the first exhaust gas treatment device, with reference to the direction of flow of the exhaust gases,
- a system for feeding secondary air into the exhaust gas conduit between the first and second exhaust gas treatment devices,
- a system for controlling the air/fuel ratio of the engine, and
- an electronic controller programmed for controlling the secondary air feeding system and the system for controlling the air/fuel ratio.

In general, the system for controlling the air/fuel ratio includes means for regulating the injected fuel quantity (by adjustment of the opening duration of fuel injectors associated to the engine cylinders) and means for regulating the air quantity introduced into the cylinders.

PRIOR ART

A system of the above indicated type is described and shown for example in document U.S. Pat. No. 3,943,709.

Secondary air feeding systems are well known and have been used since long in spark-ignition internal combustion engines, in order to improve the engine behavior and also in order to accelerate the warm-up process of the catalytic converter, during warm-up of the engine. Secondary air feeding systems are also largely used in engines for motor-cycles which make use of treatment systems having an oxidation catalytic converter in place of a three-way catalytic converter, which is more common in applications for cars.

The most conventional solutions in the field of secondary air feeding systems aim to stabilize the combustion as well as to warm-up the catalytic converter more rapidly during engine warm-up. In these more conventional solutions, the engine is operated with a rich air/fuel mixture, i.e. with a quantity of fuel greater than that corresponding to a stoichiometric proportion. The secondary air is fed downstream of the engine exhaust valves, and upstream of the catalytic converter. The secondary air is therefore used for completing the oxidation reactions upstream of the catalytic converter and within the catalytic converter and also for providing a quicker warm-up of the catalytic converter due to the exothermic reactions which are generated for the presence of high quantities of carbon oxide and unburned hydrocarbons which are produced by the engine when operating with a rich mixture.

Solutions of this type are also disclosed for example in documents U.S. Pat. Nos. 5,388,402, 5,410,872, 5,412,943, 5,456,063, 5,666,804, 6,978,600, 5,519,992.

As indicated in the foregoing, a system having the features which have been specified at the beginning of the present description is known from document U.S. Pat. No. 3,943,709. This known solution proposes a system with two catalytic converters. The first converter is used as a reduction converter, for reducing the $NO_x$s, whereas the second converter is an oxidation converter, which is used for oxidizing HCs and COs. In this known solution, the secondary air feeding system is configured for introducing secondary air not only between the first converter and the second converter, but also upstream of the first converter.

OBJECT OF THE INVENTION

The object of the present invention is that of providing a system and a method for controlling the emissions of a spark-ignition internal combustion engine, which system and method enable very reduced levels of noxious emissions to be obtained in all operating conditions of the engine.

It is in particular an object of the invention to reduce the noxious emissions also at high engine loads and/or high engine speeds, while operating the engine with a reach air/fuel mixture, above the stoichiometric level, in order to protect the engine components (thanks to the heat subtracted by the gasoline to the intaken air).

A further object of the invention is that of providing a system of the above indicated type which enables the temperature of the engine components, the exhaust conduits, the turbocharger (if any) and the catalytic converters to be reduced.

A further object of the invention is that of achieving the above indicated goals while also reducing the fuel consumption in all the operating conditions of the engine, due to the possibility of designing the engine with a higher compression ratio, so as to improve combustion at high engine loads and high engine speeds.

A further object of the invention is that of providing a system and a method of the above indicated type which also prevent an accumulation of particulate which might generate a counter-pressure in the engine.

SUMMARY OF THE INVENTION

In view of achieving one or more of the above indicated objects, the present invention provides a system for controlling the emission of a spark-ignition internal combustion engine of a motor-vehicle, comprising:
- a conduit for the exhaust gases of the internal combustion engine,
- a first exhaust gas treatment device, interposed in the exhaust gas conduit, and a second exhaust gas treatment device interposed in the exhaust gas conduit, downstream of the first exhaust gas treatment device, with reference to the direction of flow of the exhaust gases,
- a system for feeding secondary air into the exhaust gas conduit between the first and second exhaust gas treatment devices,
- a system for controlling the air/fuel ratio of the engine, an electronic controller programmed for controlling the secondary air feeding system and the system for controlling the air/fuel ratio, said system being characterized in that:

the secondary air feeding system is configured for feeding secondary air into the exhaust gas conduit only between the first and second exhaust gas treatment devices, the second exhaust gas treatment device is arranged sufficiently far away from the first exhaust gas treatment device so as to obtain that the temperature in the second exhaust gas treatment device is lower by at least 50° C. with respect to the temperature in the first exhaust gas treatment device, the electronic controller is programmed for activating the secondary air feeding system when the load of the engine is greater than a predetermined load value and/or when the engine rotational speed is greater than a predetermined speed value, the electronic controller is programmed for keeping the air/fuel ratio substantially at a stoichiometric value when the load of the engine is lower than said predetermined load value and/or when the engine rotational speed is lower than said predetermined speed value, the electronic controller is programmed for keeping the air/fuel ratio at a value lower than the stoichiometric value (preferably not greater than 95% of the stoichiometric value) so as to feed a rich mixture to the engine, when the load of the engine is greater than said predetermined load value and/or when the engine rotational speed is greater than said predetermined speed value, and the electronic controller is programmed so that, when the secondary air feeding system is activated, the quantity of secondary air is controlled on the basis of a signal emitted by a lambda probe arranged downstream of the second exhaust gas treatment device, in order to provide a mixture with a stoichiometric, or greater than stoichiometric, air/fuel ratio in the second exhaust gas treatment device.

In the case in which the internal combustion engine is supercharged by a compressor driven by a turbine actuated by the exhaust gases, the secondary air feeding system may comprise, for example, an electronic control valve interposed in the conduit for feeding air to the engine, downstream of the compressor, and having an outlet connected to the exhaust gas conduit between the first and second exhaust gas treatment devices. Alternatively, the secondary air feeding system may comprise an air feeding auxiliary line and an electrically driven pump arranged along this auxiliary line.

Preferably, when the secondary air feeding system is activated, the above-mentioned electronic controller is programmed for controlling the feeding of secondary air also on the basis of a detected or calculated value of the temperature of the exhaust gases in the second exhaust gas treatment device.

In an actual embodiment, the electronic controller is programmed for controlling the activation of the secondary air feeding system on the basis of a map, as a function of values of the engine load and the engine rotational speed, as will be illustrated more in detail hereinafter.

The second exhaust gas treatment device may be an oxidation (two-way) catalytic converter or a three-way catalytic converter or a gasoline particulate filter (GPF) for gasoline engines or a three-way catalytic converter in association to a GPF. The first exhaust gas treatment device is preferably a three-way catalytic converter.

Also preferably, the second exhaust gas treatment device is provided for being arranged outside of the motor-vehicle, below the floor panel, whereas the first exhaust gas treatment device is provided for being located inside the motor-vehicle, above the floor panel.

Due to the above indicated features, the system according to the invention is able of achieving a number of important advantages. First of all, the invention enables controlled and reduced noxious emissions to be obtained also in an engine of high specific power in all the operating conditions, including the operating conditions at high engine loads and/or high engine speeds. The engine is operated in these conditions while keeping the exhaust gas system at a relatively reduced temperature. The invention is able of reducing the noxious emissions to values consistent with future regulations and avoids that a slight enrichment of the mixture fed to the engine at high loads and high speeds may imply relevant alterations of the emissions in these conditions.

In summary, the invention keeps the noxious emissions of a gasoline engine substantially constant during all the operating conditions.

Further advantages lie in a reduction of the temperature of the engine components, the exhaust conduits, the turbocharger (if present) and the catalytic converters. The noxious emissions are reduced also when operating with medium/low engine loads and speeds. The performance of the engine is preserved and consumption is improved in all the operating conditions, due to the possibility of increasing the compression ratio and improving combustion at high loads and high engine speeds.

In the case in which a gasoline particulate filter (GPF) for gasoline engines is used, which provides a 4-way function, the result is obtained not only of minimizing HC, CO and NOx emissions, but also it is avoided that in the particulate filter a quantity of particulate can be accumulated sufficient to increase a counter-pressure in the engine, which result also is beneficial for the engine performance and for the reduction of the fuel consumption.

The electronic controller can be programmed for activating the secondary air feeding system also for warming-up the second exhaust gas treatment device at low engine loads, during warm-up of the engine, or for regenerating a particulate filter (GPF), in case this is provided.

DESCRIPTION OF THE DRAWINGS

Further features and advantages of the invention will become apparent from the description which follows with reference to the annexed drawings, given purely by way of non limiting example, in which.

DETAILED DESCRIPTION

Figure 1:
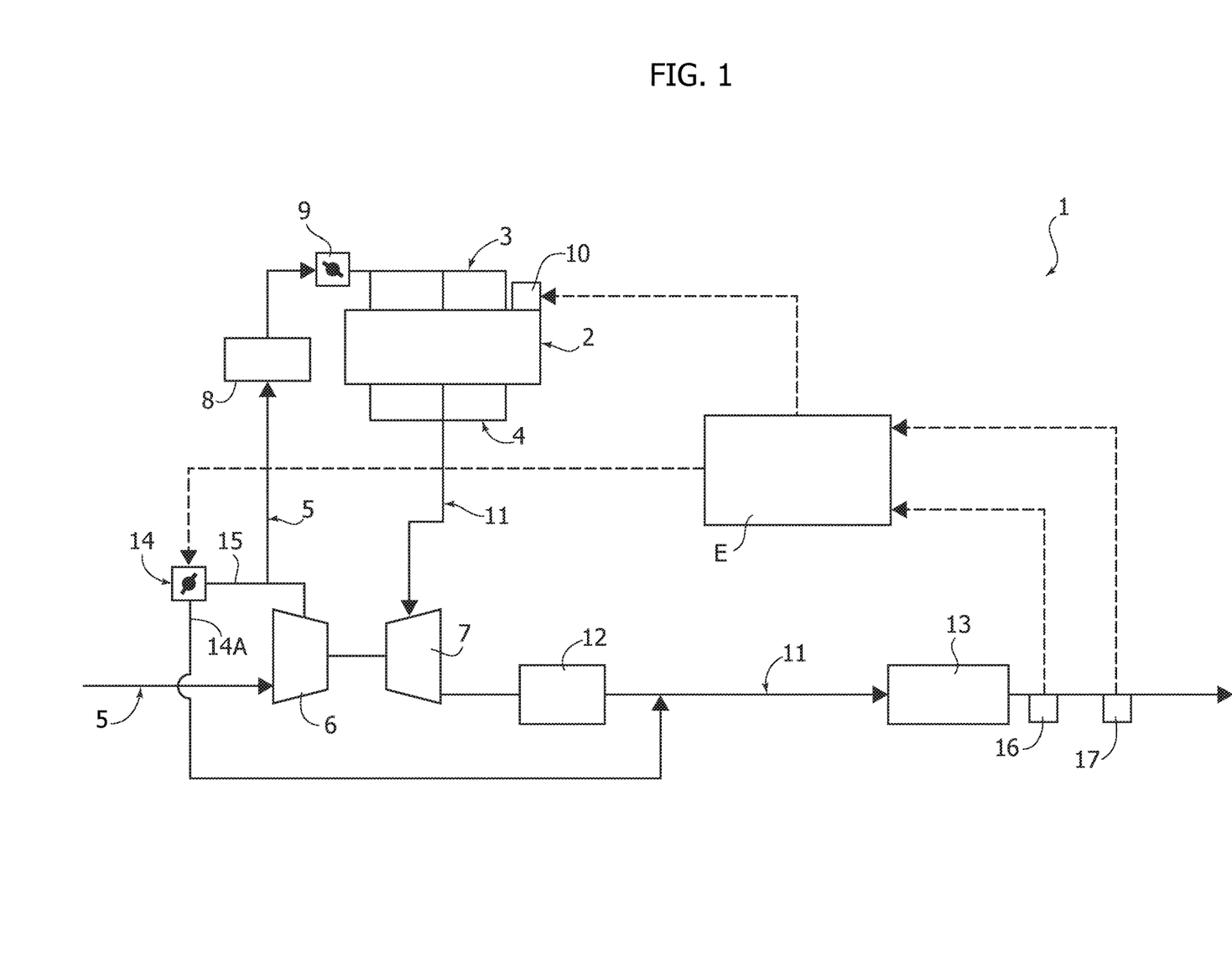
FIG. 1 shows a diagram of a first embodiment of a system according to the invention.
Figure 2:
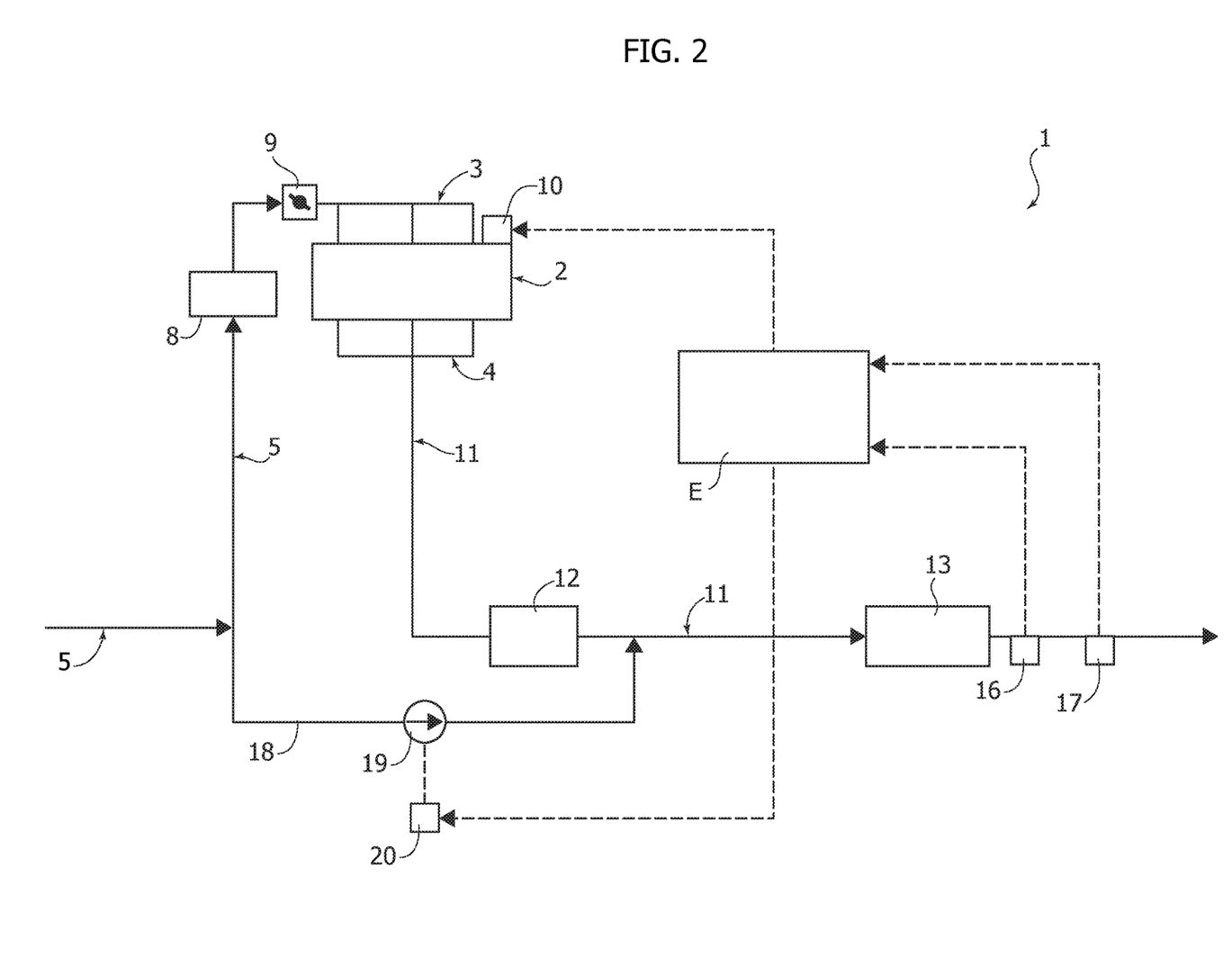
FIG. 2 shows a diagram of a second embodiment of the system of the invention.

In FIGS. 1, 2 common parts are designated by the same reference numerals.

In the drawings, reference numeral 1 generally designates a system for controlling the emissions of a spark-ignition internal combustion engine, operating with gasoline. Reference numeral 2 designates the engine block having a plurality of cylinders (not shown) to which an intake manifold 3 and an exhaust manifold 4 are associated. The intake manifold 3 receives the air to be fed to the engine through an intake conduit 5. In the intake conduit 5, upstream of the intake manifold 3, there are interposed in sequence, in the example of FIG. 1, a compressor 6 for supercharging the engine, which is driven by a turbine 7 actuated by the engine exhaust gases, a device 8 for cooling the feeding air and a throttle valve 9.

To the engine cylinders there are associated respective fuel injectors which are electromagnetically actuated, represented by a block 10. The exhaust manifold 4 of the engine 2 conveys the exhaust gases into an exhaust conduit 11 in which there are interposed the turbine 7 for driving the compressor 6, a first exhaust gas treatment device 12 and a second exhaust gas treatment device 13.

Engine 2 is further provided with a secondary air feeding system for feeding secondary air into the engine exhaust conduit 11. In the case of the solution of FIG. 1, the secondary air feeding system comprises an electronically controlled valve 14 which is connected through a line 14A to the conduit 11.

With reference to FIG. 1, block E diagrammatically represents an electronic controller which is programmed for controlling the injection of fuel into the engine by means of the injectors 10 and for controlling the supply of secondary air by means of the valve 14.

The annexed drawings do not show all the details forming part of the fuel injection control system, including, inter alia, lambda probes upstream and downstream of device 12, which typically is a catalytic converter, nor they show the system for controlling the throttle valve 9, which can be of any known type.

The electronic controller E is programmed for controlling the injectors 10 and valve 14 also on the basis of a signal emitted by a lambda sensor 16 arranged downstream of the second exhaust gas treatment device 13 and also on the basis of a signal emitted by a sensor 17 for sensing the temperature of the exhaust gases downstream of the second exhaust gas treatment device 13. In place of the sensor 17, the electronic controller E can be programmed for calculating the value of the temperature of the exhaust gases downstream of the second exhaust gas treatment device 13, as a function of operating parameters of the engine.

FIG. 2 differs from FIG. 1 for that the engine is not a supercharged engine. In this case secondary air is fed through an auxiliary line 18, derived from the main line 5 for feeding air to the engine. In line 18 a pump 19 is interposed which is actuated by an electric motor 20, whose operation is controlled by the electronic controller E. The pump 19 could also be actuated mechanically, for example by the engine.

Whatever is the embodiment, it is important that the second exhaust gas treatment device 13 is arranged sufficiently far away from the first exhaust gas treatment device 12 in order to obtain that the temperature of the exhaust gases in the second device 13 is lower by at least 50° C. with respect to the temperature in the first exhaust gas treatment device 12.

In the system according to the invention, the electronic controller E is programmed for activating the secondary air feeding system only when the engine load is greater than a predetermined value of the load and/or only when the engine rotational speed is greater than a predetermined speed value.

When feeding of secondary air is not activated, the electronic controller E is programmed for keeping the air/fuel ratio substantially at a stoichiometric value. Instead, when the feeding of secondary air is activated, the electronic controller E is programmed for keeping the air/fuel ratio at a value lower than the stoichiometric value, for example not greater than 95% of the stoichiometric value.

Furthermore, when the secondary air feeding system is activated, the electronic controller is programmed for controlling a quantity of secondary air also on the basis of the signal emitted by the lambda probe 16, according to a closed-loop strategy, so as to provide a mixture in the second exhaust gas treatment device 13 having an air/fuel ratio corresponding to the stoichiometric value or greater than the stoichiometric value.

As indicated in the foregoing, preferably the electronic controller E also takes into account a detected or calculated value of the temperature of the exhaust gases in the device 13.

Figure 3:
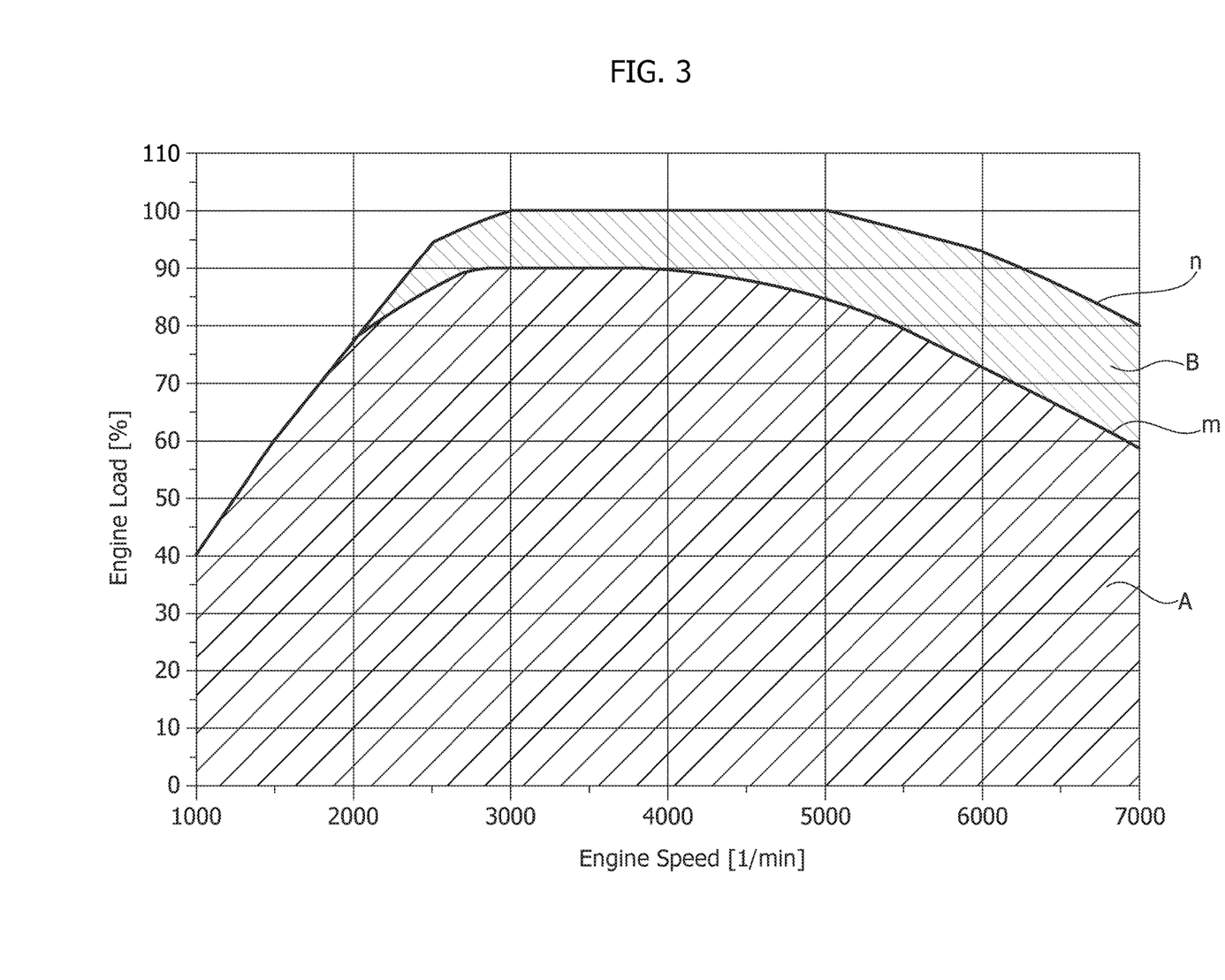
FIGS. 3, 4 are diagrams which show the principle of operation of the invention.
Figure 4:
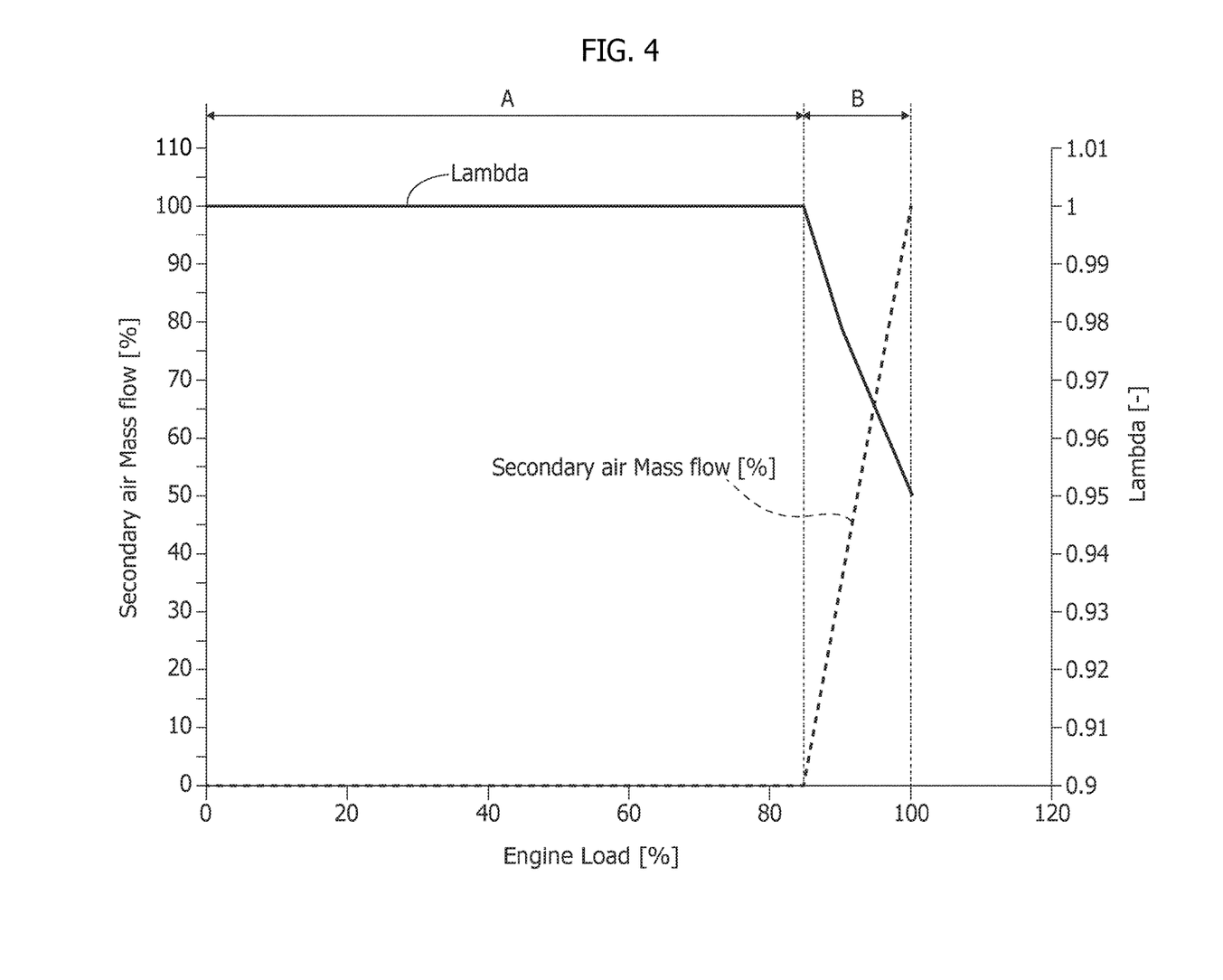

In one actual embodiment, the electronic controller is programmed for controlling the activation of the secondary air feeding system on the basis of a map, as a function of the values of the engine load and the engine rotational speed, such as that illustrated purely by way of example in FIG. 3. In this figure, area A below line m is that relating to the operation of the engine with no secondary air, with an air/fuel ratio in the engine cylinders substantially corresponding to the stoichiometric value. The area B between lines m and n is that relating to operation of the engine with secondary air, with an air/fuel ratio in the engine cylinders lower than the stoichiometric value (i.e. with a rich mixture). FIG. 4 shows another diagram which shows the relative variation of a so-called lambda value (air/fuel ratio/stoichiometric ratio) and the variation of secondary air mass flow as a function of the engine load, for a given engine rotational speed (5000 rpm in this specific case).

As illustrated, in the case of this example, in the range below 85% of the maximum load, the system operates with no secondary air. At higher loads, the secondary air is activated to enable a simultaneous reduction of the lambda value in the cylinders. The thresholds are variable from one engine to the other. For a turbocharged engine of recent generation, 85% of the maximum load may correspond to a BMEP (Brake Mean Effective Pressure) of 15-27 bars. For a non-supercharged engine, 85% of the load may correspond to a BMEP of 5-9 bars. These values are however linked to a specific example and may widely vary depending upon the characteristics of the engine.

In general, the configuration of the map of FIG. 3 may greatly vary depending upon the characteristics of the engine.

In the preferred embodiment, the second exhaust gas treatment device 13 is either an oxidation, also called "two-way", catalytic converter or a three-way, also called trivalent, catalytic converter, or a gasoline particulate filter for gasoline engines (GPF). The first exhaust gas treatment device 12 is preferably of the three-way type.

In order to ensure a sufficient distance between the two exhaust gas treatment devices 12,13 and for providing a sufficient reduction of the temperature of the exhaust gases upstream of the second device 13, it can be provided that the second exhaust gas treatment device 13 is arranged outside the motor-vehicle, below the floor panel, whereas the first device 12 is provided to be located inside the motor-vehicle, above the floor panel.

The invention thereby reaches the object of minimizing noxious emissions of a spark-ignition engine at medium/high engine rotational speeds and medium/high engine loads as well as to simultaneously reduce NOx, CO and HC emissions. In particular, the engine operates with a stoichiometric mixture in all the operating conditions except for conditions of medium/high engine rotational speeds and medium/high engine loads. In these conditions the engine is operated with a slightly rich mixture to simultaneously enable a higher combustion velocity, a better combustion timing with beneficial effects on engine performance, and a lower production of nitrogen oxides. By using a conventional catalytic converter, much higher HC and CO emissions would be obtained with respect to the conditions in which the engine operates with a stoichiometric mixture. If instead the engine should operate in stoichiometric conditions, the combustion would be worsened and, in addition to this, the temperature, in particular in the catalytic converter, would increase due to the presence of oxygen which would react in the catalytic converter so as to greatly increase the temperature thereof. Therefore, the engine performance would be limited by the higher temperatures of the exhaust system, the catalytic converter and turbocharger. To avoid this drawback, the proposed solution makes use of a secondary air system and two catalytic converters. The second converter is positioned far away from the first converter to enable the reduction of the temperature of the exhaust gases and to render the conversion tolerable of the noxious emissions in presence of oxygen. In particular, as indicated, the second catalytic converter can be arranged below the motor-vehicle panel, in particular in a motor-vehicle with front engine, and in general far away from the first catalytic converter, at a distance sufficient for enabling a reduction by at least 50° C. of the temperature of the second converter with respect to that of the first converter. The secondary air is introduced downstream of the first converter in a quantity such as to provide a mixture in the second converter having an air/fuel ratio corresponding to the stoichiometric value or greater than the stoichiometric value, so as to obtain an efficient oxidation of the noxious emissions which are not treated by the first catalytic converter due to the absence of oxygen. By using this system, reduced levels of noxious emissions are obtained in all the operating conditions of the engine, including the above mentioned most critical conditions (medium/high rotational speeds and medium/high engine loads). As already indicated, the second catalytic converter can be an oxidation catalytic converter, a three-way catalytic converter (TWC) or an impregnation (GPF), so as to treat not only particle and particulate emissions, but also other noxious emissions (HC,CO,NOx). As already indicated in the foregoing, the engine control system must include, in addition to the lambda probes before and after the catalytic converter 12, also sensors which enable a control of the quantity of secondary air to provide air/fuel proportions as indicated above. In particular, the system must include at least one linear lambda probe after the second catalytic converter to enable an adjustment of the mixture ratio, with a closed-loop strategy in the system for adjusting the mass flow of secondary air.

The strategy for controlling the secondary air is activated by the electronic controller of the engine at medium/high rotational speeds and loads, by activating the introduction of secondary air, by adjusting the engine mixture ratio and by adjusting the air quantity based on the signals of the lambda probes. A calculation of the temperature upstream of the second converter can be made through a mathematical model, on the basis of the air/fuel ratio of the engine and the quantity of the secondary air introduced downstream of the first catalytic converter, to avoid overheating of the second catalytic converter, or alternatively a direct measurement of the temperature can be provided. In case a GPF is provided having a 4-way function, located below the floor panel, the difference between the pressures upstream and downstream of the GPF must be monitored.

The electronic controller can be programmed for activating the secondary air feeding system also for warming-up the second catalytic converter at low engine loads, during engine warm-up, or for regenerating a particulate filter (GPF) in case this is provided.

The system according to the invention also provides further advantages in the specific case of a supercharged engine. In some areas of engine operation, particularly at low revs (for example up to 3000 rpm) and at high engine loads, high supercharging pressures with low air flows are required. The secondary air supply system can be activated under such conditions to increase the air flow of the compressor. In this way an increase in efficiency of the compressor is obtained and at the same time a risk of a pumping effect of the compressor itself is avoided. The system configured in this manner provides an increase of the maximum torque of the engine at low revs and/or to select a compressor of bigger size, with benefits at high power (high loads and high revolutions). This advantage is even more evident when the turbocharger is connected to an electric motor. In this case, thanks to the presence of the electric motor that drives the compressor, a significantly larger compressor can be selected, so as to obtain a very high maximum torque at low revolutions, by activating the secondary air system. Thanks to the increased dimensions of the compressor, in fact, at high loads and at high revolutions, a higher efficiency of the turbocharger is obtained, with benefits on engine performance and fuel consumption.

Naturally, while the principle of the invention remains the same, the details of construction and the embodiments may widely vary with respect to what has been described and illustrated purely by way of example, without departing from the scope of the present invention.

What is claimed is:

1. A system for controlling emissions of a spark-ignition internal combustion engine of a motor-vehicle, comprising:
    an exhaust gas conduit for exhaust gases of the internal combustion engine,
    a first exhaust gas treatment device interposed in the exhaust gas conduit and a second exhaust gas treatment device interposed in the exhaust gas conduit, downstream of the first exhaust gas treatment device, with reference to a direction of flow of the exhaust gases,
    a system for feeding secondary air into the exhaust gas conduit between the first and second exhaust gas treatment devices,
    a system for controlling an air/fuel ratio of the internal combustion engine, and
    an electronic controller configured for controlling the system for feeding secondary air and the system for controlling the air/fuel ratio,
    wherein:
    the system for feeding secondary air is configured for feeding the secondary air into the exhaust gas conduit only between the first and second exhaust gas treatment devices,
    the second exhaust gas treatment device is arranged away from the first exhaust gas treatment device by a distance so as to obtain that a temperature of the exhaust gases in the second exhaust gas treatment device is lower by at least 50° C. with respect to a temperature of the exhaust gases in the first exhaust gas treatment device,
    the electronic controller is configured for activating the system for feeding secondary air when an engine load of the internal combustion engine is greater than a predetermined load value and/or when a rotational speed of the internal combustion engine is greater than a predetermined speed value, the electronic controller is configured for keeping the air/fuel ratio substantially at a stoichiometric value when the engine load is lower than said predetermined load value and/or when the engine rotational speed is lower than said predetermined speed value, the electronic controller is configured for keeping the air/fuel ratio at a value lower than the stoichiometric value, so as to feed a rich mixture to the internal combustion engine, when the engine load is greater than said predetermined load value and/or when the engine rotational speed is greater than said predetermined speed value, and the electronic controller is configured so that, when the system for feeding secondary air is activated, a quantity of secondary air is controlled on the basis of a signal emitted by a lambda probe arranged downstream of the second exhaust gas treatment device in order to obtain a mixture with an air/fuel ratio corresponding to the stoichiometric value or greater than the stoichiometric value in the second exhaust gas treatment device.

2. The system according to claim 1, wherein the internal combustion engine is an engine supercharged by a compressor, and wherein the system for feeding secondary air comprises an electronically controlled valve interposed in a conduit for feeding air to the engine, downstream of the compressor and having an outlet connected to the exhaust gas conduit, between the first and second exhaust gas treatment devices.

3. The system according to claim 1, wherein the system for feeding secondary air comprises an auxiliary air feeding line and an electrically actuated pump arranged in said auxiliary feeding line.

4. The system according to claim 1, wherein said electronic controller is configured so that, when the system for feeding secondary air is activated, the quantity of secondary air is controlled also on a basis of a detected or calculated value of the temperature of the exhaust gases in the second exhaust gas treatment device.

5. The system according to claim 1, wherein the electronic controller is configured for controlling activation of the system for feeding secondary air on a basis of a map, as a function of values of the engine load and the engine rotational speed.

6. The system according to claim 1, wherein the electronic controller is configured for activating a feeding of secondary air for warming up the second exhaust gas treatment device during engine warm-up.

7. The system according to claim 1, wherein the electronic controller is configured for activating a feeding of secondary air when a need is detected of regenerating a particulate filter which is arranged in said exhaust gas conduit.

8. The system according to claim 1, wherein the second exhaust gas treatment device is a two-way or three-way catalytic converter or a particulate filter for gasoline engines.

9. The system according to claim 1, wherein the first exhaust gas treatment device is a three-way catalytic converter.

10. The system according to claim 1, wherein the second exhaust gas treatment device is configured to be arranged outside of the motor-vehicle, below a floor panel, whereas the first exhaust gas treatment device is configured to be located inside the motor-vehicle above the floor panel.

11. A method for controlling emissions of a spark-ignition internal combustion engine for motor-vehicles, comprising:
providing a first exhaust gas treatment device and a second exhaust gas treatment device in an exhaust gas conduit of the engine, the second exhaust gas treatment device being arranged downstream of the first exhaust gas treatment device, with reference to a direction of flow of exhaust gases, providing a secondary air feeding system in the exhaust gas conduit between the first and second exhaust gas treatment devices, and providing a system for controlling an air/fuel ratio of the engine, wherein:

the secondary air feeding system is configured for feeding secondary air into the exhaust gas conduit only between the first and second exhaust gas treatment devices, the second exhaust gas treatment device is arranged away from the first exhaust gas treatment device by a distance so as to obtain that a temperature of the exhaust gases in the second exhaust gas treatment device is lower by at least 50° C. with respect to a temperature of the exhaust gases in the first exhaust gas treatment device, said method further comprising:

activating the secondary air feeding system when a load of the engine is greater than a predetermined load value and/or when a rotational speed of the engine is greater than a predetermined speed value, keeping the air/fuel ratio substantially at a stoichiometric value when the load of the engine is lower than said predetermined load value and/or when the rotational speed of the engine is lower than said predetermined speed value, keeping the air/fuel ratio at a value lower than the stoichiometric value, so as to feed the engine with a rich mixture, when the load of the engine is greater than said predetermined load value and/or when the rotational speed of the engine is greater than said predetermined speed value, and when the secondary air feeding system is activated, controlling a quantity of a secondary air on a basis of a signal emitted by a lambda probe arranged downstream of the second exhaust gas treatment device, so as to obtain a mixture having an air/fuel ratio corresponding to the stoichiometric value or to a value greater than the stoichiometric value in the second exhaust gas treatment device.

12. The method according to claim 11, wherein when the secondary air feeding system is activated, the quantity of secondary air is controlled also on a basis of a detected or calculated value of the temperature of the exhaust gases in the second exhaust gas treatment device.

13. The method according to claim 11, wherein activation of the secondary air feeding system is controlled on a basis of a map, as a function of values of the load and rotational speed of the engine.

14. The method according to claim 11, wherein the secondary air feeding system is activated for warming-up the second exhaust gas treatment device during engine warm-up.

15. The method according to claim 11, wherein the secondary air feeding system is activated when a need is detected of regenerating a particulate filter which is arranged in said exhaust gas conduit.

16. The method according to claim 11, wherein the engine is supercharged by a compressor, and wherein the secondary air feeding system is activated at low revolutions and at high engine loads, in order to operate the compressor with a higher air flow, in order to increase a maximum engine torque at low revolutions and/or in order to be able to select a larger compressor.

\* \* \* \* \*